2,913,476
SULFONAMIDO DIALKYL PHOSPHATES AND PROCESS OF MAKING SAME

Rudi F. W. Rätz, Columbus, Ohio, assignor to Olin Mathieson Chemical Corporation, a corporation of Virginia No Drawing. Application November 5, 1954
Serial No. 467,234

17 Claims. (Cl. 260—461)

This invention relates to novel compositions of matter and to a method for preparing them. More particularly, the new compositions are sulfonamidophosphoric esters of the formula: $RSO_2NH.P(:X)(OR')_2$, where R is a hydrocarbon, substituted hydrocarbon or heterocyclic radical, X is oxygen or sulfur and R' is an alkyl group of 1 to 8 carbon atoms. The novel method of preparing these sulfonamido-phosphoric esters comprises the reaction of an appropriate alkali metal sulfonamide with a dialkyl halophosphate.

The compounds of the present invention are useful as insecticides, especially as aphicides and miticides, and as chemical intermediates.

The R of the sulfonamide radical in the formula above can be aliphatic, alicyclic, aromatic or heterocyclic radicals which can carry substituent groups. Examples of suitable aliphatic sulfonamides which can be used to contribute the R radical to the novel compounds include methyl, ethyl, n-propyl, n-butyl, isobutyl, n-amyl, isoamyl, n-hexyl, n-octyl, 2-ethylhexyl and n-dodecyl sulfonamides and the like. Examples of aromatic and substituted aromatic radicals include phenyl, o-tolyl, p-tolyl, xylyl, p-nitrophenyl, p-chlorophenyl, p-bromophenyl, naphthyl, 2,4-dinitrophenyl, p-methoxyphenyl, m-carboxyphenyl, p-acetaminophenyl and the like. These radicals are introduced by using as reactants the corresponding sulfonamides, for example, p-chlorobenzene sulfonamide. If desired, R can be a cycloalkyl radical or an arylalkyl radical. Compounds falling within the scope of the present invention in which R is one of these can be prepared by the use of cyclopentyl, cyclohexyl, benzyl or phenylethyl sulfonamides or the like. Heterocyclic sulfonamides which are useful starting materials in preparing the compounds of the present invention include the amides of pyridine-3-sulfonic acid, quinoline-8-sulfonic acid, dibenzofurane-2-sulfonic acid and the like.

These sulfonamides readily form alkali metal derivatives by replacing one of the amino hydrogen atoms, for example, by adding the calculated quantity of sodium methylate or potassium methylate to a methanolic solution of the sulfonamide and evaporating to dryness.

The dialkyl halophosphates are easily prepared by the halogenation of the corresponding dialkyl hydrogen phosphites at low temperatures. In the dialkyl halophosphate, the halogen can be chlorine or bromine, for example, and the alkyl groups can be methyl, n-butyl, n-hexyl, n-octyl, 2-ethylhexyl or the like. The reaction mixture is suitably distilled to separate and purify the desired product.

The process of the present invention comprises the reaction of an alkali metal derivative of a sulfonamide with a dialkyl halophosphate generally according to the following equation:

$$RSO_2NHM + X'PX(OR')_2 \rightarrow RSO_2NH.PX(OR')_2 + MX'$$

in which R and R' have the meanings ascribed above, M is an alkali metal and X' is a halogen. The alkali metal derivative, for example, the sodium derivative, of the sulfonamide is finely ground and dispersed in an inert solvent suitably benzene, toluene, cyclohexane or a petroleum fraction of similar boiling range such as Skellysolve C, petroleum ether or normal hexane. Ketones are also suitable inert solvents. Examples include acetone, methyl ethyl ketone and 4-methylpentanone-2. The dialkyl halophosphate is added and the mixture is refluxed suitably at about 60 to 110° C. for a period of about 1 to 5 hours. The alkali metal halide separates usually in the form of a colloidal dispersion and can be removed by washing with water. The product is then recovered from solution in the inert solvent. This is usually done by evaporation of the solvent, the final evaporation being in a vacuum. The product can be further purified by recrystallization.

Certain substituents of the compounds of the present invention can be converted to other substituents in known ways to obtain other products of the present invention. For example, p-nitrobenzenesulfonamido diethyl phosphate may be catalytically hydrogenated to p-amidobenzenesulfonamido diethyl phosphate and p-carboxybenzenesulfonamido diethyl phosphate can be esterified to p-carbethoxybenzenesulfonamido diethyl phosphate.

Example I $$(p)CH_3C_6H_4SO_2NH.PO(OC_2H_5)_2$$

Dry p-toluene sulfonamide sodium salt (96.5 grams; 0.5 mole) was suspended in 400 milliliters of dry benzene and 86.25 grams (0.5 mole) of diethyl chlorophosphate was added dropwise with stirring at 70° C. The mixture was refluxed for three hours and cooled to 10° C. A mixture of p-toluene sulfonamide and sodium chloride was removed by filtration. The benzene filtrate was washed twice with 50 milliliter portions of water and dried over anhydrous sodium sulfate. The dried solution was filtered and the solvent distilled off, leaving as residue 120 grams of an almost clear, colorless oil. The oil was dissolved in carbon tetrachloride and filtered to remove small remaining amounts of crystalline p-toluenesulfonamide. The carbon tetrachloride was removed by distillation leaving 100 grams of residual oil. Analysis showed that it was a mixture of approximately equal weights of p-toluenesulfonamido diethyl phosphate and N-p-toluenesulfotetraethyl-imino-pyrophosphate. The oil was stirred at room temperature with saturated aqueous sodium hydrogen carbonate solution for 0.5 hour and extracted with ether to remove the pyrophosphate. Acidifying the aqueous portion with dilute hydrochloric acid liberated 35 grams of an almost colorless oil which was the desired p-toluenesulfonamido diethyl phosphate having the following analysis:

Calculated for $C_{11}H_{18}O_5SNP$: P, 10.1; N, 4.57. Found: P, 9.95, 9.93; N, 4.75, 4.81.

Example II $$C_6H_5CH_2SO_2NH.PO(OC_2H_5)_2$$

To a suspension of 11 grams (0.057 mole) of benzylsulfonamide sodium salt in 100 milliliters of dry benzene was added 9.18 grams (0.057 mole) of diethyl chlorophosphate at 70° C. The mixture was refluxed for two hours, cooled and worked up as described in Example I. The oil recovered after the removal of carbon tetrachloride was extracted with sodium hydrogen carbonate as described in Example I recovering 7 grams or 41.5% of the theoretical yield. Approximately an equal amount of pyrophosphate was also obtained. Analysis of the desired product follows:

| | P, Percent | N, Percent |
|---|---|---|
| Calculated for $C_{11}H_{18}O_5NSP$ | 10.10 | 4.57 |
| Found | 10.43 | 4.10 |

Example III (p)NO$_2$C$_6$H$_4$SO$_2$NH.PO(OC$_2$H$_5$)$_2$

To a suspension of 22.4 grams (0.1 mole) of powdered carefully dried p-nitrobenzenesulfonamide sodium salt in 400 milliliters of dry benzene was added 17.25 grams (0.1 mole) of diethyl chlorophosphate. The mixture was refluxed for 4 hours and filtered, removing 5.1 grams of p-nitrobenzenesulfonamide. The solvent was removed in a vacuum and 17 grams of a clear yellowish oil was obtained as residue. The oil was purified by washing with aqueous salt solution. On adding 10 grams of ethyl ether, slightly yellowish crystals separated which were recrystallized from a mixture of petroleum ether and alcohol. The yield was 9 grams or 35.6% of theory, taking into account the recovery of 5.1 grams (0.025 mole) of p-nitrobenzenesulfonamide. The crystals melted at 139° C. and showed the following analysis:

|  | C, Percent | H, Percent | N, Percent | S, Percent | P, Percent |
| --- | --- | --- | --- | --- | --- |
| Calculated for C$_{10}$H$_{15}$O$_7$N$_2$SP | 35.55 | 4.44 | 8.28 | 9.47 | 9.10 |
| Found | 35.51 | 4.78 | 8.28 | 9.57 | 9.10 |

These analytical data show excellent agreement with the formula shown at the beginning of this example for p-nitrobenzenesulfonamido diethyl phosphate. The new substance is readily soluble in benzene, chloroform, dioxane and alcohol. It dissolves in sodium bicarbonate solution evolving carbon dioxide. Addition of dilute hydrochloric acid to the solution precipitates the amide unchanged. The product is stable for short periods to heating with concentrated aqueous mineral acids, for example, hydrochloric acid, and on cooling the compound crystallizes unchanged. On refluxing a solution in normal hydrochloric acid for two hours, the sulfonamide is largely hydrolyzed and p-nitrobenzenesulfonamide, melting at 178° C. is obtained as product.

The sodium salt can be obtained from the bicarbonate solution by evaporating to dryness in a vacuum. The salt is stable, non-hydroscopic and is suitable for further reaction with halogen-containing compounds. It is not decomposed by heating at 50° C. in an alkaline solution at pH 11.5 for 96 hours. However, refluxing with normal caustic for four hours decomposes the substance.

Example IV n-C$_4$H$_9$SO$_2$NH.PO(OC$_2$H$_5$)$_2$ n-Butanesulfonamide sodium salt was dried in an oven at 110° C. and 11.4 grams (0.072 mole) was suspended in benzene, avoiding so far as possible contact of the hygroscopic salt with air. Addition of 12.38 grams (0.072 mole) of diethyl chlorophosphate initiated an exothermic reaction which was completed by refluxing the mixture for 1.5 hours. Most of the by-product sodium chloride was removed by filtration and the filtrate was stirred for 0.5 hours at room temperature with 2 grams of magnesium oxide to neutralize acidic by-products. The solution was filtered to remove the insoluble solids and distilled to remove benzene. The residue amounted to 18 grams or 91% of the theoretical yield of a clear slightly yellowish oil soluble in common organic solvents and slightly soluble in water giving an acid reaction.

|  | P, percent |
| --- | --- |
| Calculated for C$_8$H$_{20}$O$_5$SNP | 11.36 |
| Found | 11.36; 11.28 |

Example V n-C$_4$H$_9$SO$_2$NH.PS(OC$_2$H$_5$)$_2$ 23.85 grams of n-butane sulfonamide sodium salt (0.15 mole) were suspended in 150 milliliters of dry 4-methyl-2-pentanone and 28.27 grams diethyl-thiono-chlorophosphate were added dropwise with stirring at 60° C. The reaction was completed by refluxing the reaction mixture for three hours. The colloidal sodium chloride which was formed was washed out with 35 milliliters of water. The solvent was distilled off in vacuum and the remaining oily residue dissolved in 100 milliliters of ethyl ether. The ethereal solution was washed with 10% sodium chloride solution and the ether was removed by distillation. The resulting clear and almost colorless oil amounted to 32 grams or 73.9% of the theory. The phosphorus content of this product agreed approximately with the calculated value for a compound of the above formula.

Example VI (p)ClC$_6$H$_4$SO$_2$NH.PO(OC$_2$H$_5$)$_2$ p-Chlorobenzenesulfonamide sodium salt was dried at 100° C. for three hours and 21.356 grams (0.1 mole) of the finely powdered solid was suspended in 300 milliliters of benzene. During a period of 40 minutes, 17.25 grams (0.1 mole) of diethoxyphosphorylchloride was added dropwise with stirring. The reaction temperature was maintained at 60–80° C. After addition of the acid chloride, the mixture was refluxed for four hours and cooled. The p-chlorobenzenesulfonamide melting at 143° C. was removed by filtration and amounted to 5.6 grams (0.0315 mole). (Taking into account the recovered sulfonamide, the sodium salt consumed and converted to other products amounted to 0.0685 mole. The theoretical yield of desired product is therefore 22.4 grams.) The benzene solution was washed with 30 milliliters of water and dried over sodium sulfate. After filtration, the benzene was removed by distillation leaving 26 grams of an almost colorless oil. The oil is soluble in many organic solvents including benzene, toluene, acetone, alcohol, chloroform and carbon tetrachloride. Analysis indicated that this oil consisted of 70% of p-chlorobenzenesulfonamido diethyl phosphate and 30% of p-chlorobenzenesulfonamido tetraethyl pyrophosphate. The yield of the former was therefore 18.4 grams or 81% of the theory. On standing at 0° C. the sulfonamido ester crystallized and was separated from the oily by-product by working on a porous plate. The solid was recrystallized from a mixture of ethanol and petroleum ether to obtain the product having a melting point of 139°–141° C.

|  | C, Percent | H, Percent | N, Percent | P, Percent | S, Percent | Cl, Percent |
| --- | --- | --- | --- | --- | --- | --- |
| Calculated for C$_{10}$H$_{15}$O$_5$SNPCl | 36.62 | 4.58 | 4.28 | 9.47 | 9.78 | 10.82 |
| Found | 35.92 | 4.44 | 4.33 | 9.13 | 10.16 | 10.53 |

Example VII

A solution of 1.52 grams of p-nitrobenzenesulfonamido diethyl phosphate prepared as described in Example III was prepared in 40 milliliters of absolute ethanol and 0.26 grams of platinum dioxide was added. The solution was hydrogenated at 19° C. and 743 millimeters' pressure. The hydrogen absorbed amounted to 425 milliliters equivalent to 378 milliliters under standard conditions compared to a calculated hydrogen requirement of 354 milliliters under standard conditions. The catalyst was removed by filtration and the solvent by distillation in a vacuum. The solid residue was taken up in a small amount of absolute ethanol and petroleum ether having a boiling point of 70–110° C. was added until precipitation was imminent. On standing, p-aminobenzenesulfonamido diethyl phosphate separated and was removed by filtration. It melted at 157.5 to 158.5° C. and showed the following analysis:

|  | C, Percent | H, Percent | N, Percent | P, Percent | S, Percent |
|---|---|---|---|---|---|
| Calculated for $C_{10}H_{17}O_5N_2SP$ | 39.0 | 5.51 | 9.07 | 10.03 | 10.37 |
| Found | 40.05 | 5.63 | 8.94 | 9.91 | 9.77 |

*Example VIII*

The product of Example I shows high aphicidal and miticidal action when compared with octamethyl pyrophosphoramide, sold commercially under various trade names. The test data follow:

| Compound | Percent Kill by Contact, 25 hr. | | | | Systemic Action on Pea and Melon Aphids, 48 hours |
|---|---|---|---|---|---|
|  | Concentration, p.p.m. | Melon aphid | Pea Aphid | 2-spotted Spider Mite | |
| Product of Example I | 0.05 | 100 | 100 | 100 | |
|  | 0.01 | 100 | 69 | 100 | 100 |
| Commercial octamethyl pyrophosphoramide | 0.01 | 100 | 60 | None | 100 |

These data show that the product of this example is at least as effective as the commercially acceptable aphicide and in addition possesses a high miticidal activity completely lacking in the commercial product.

*Example IX*

The product of Example IV was compared with a proprietary bis(carbethoxy)ethyl dimethyl dithiophosphate and with nicotine sulfate as a miticide and aphicide. Numerical results were as follows:

| Compound | Conc., Percent | Percent Kill by Contract, 24 hr. | | | |
|---|---|---|---|---|---|
|  |  | German Roach | Melon Aphid | Pea Aphid | 2-Spotted Spidermite |
| Product of Example IV | 0.1 | 100 | 100 | 100 | 100 |
| Do | .01 | | | | 98 |
| Do | .005 | | | | 98 |
| Do | .0025 | | | 97 | 92 |
| Proprietary dithiophosphate | .01 | | | | 73 |
| Do | .0025 | | 90 | | 35 |
| Nicotine sulfate | .0025 | | 86 | | |

These data show that the product of Example IV is an excellent insecticide and is particularly effective at low concentrations against aphids and the two-spotted spider mite. Calculations based on the data for this mite show $LD_{90}$ for the product of Example IV is 0.002 and for the proprietary dithiophosphate is 0.025. Thus the product of this invention is 12.5 times as effective as the commercially accepted miticide.

I claim:

1. Compounds selected from the groups consisting of p-toluene-sulfonamido diethyl phosphate and compounds of the formula $RSO_2NH.P(:X)(OR')_2$, in which R is an organic substituent selected from the group consisting of lower alkyl, phenyl lower alkyl, nitrophenyl, chlorophenyl and aminophenyl; in which X is selected from the group consisting of oxygen and sulfur; and in which R' is an alkyl group having from one to 8 carbon atoms.

2. The compounds of claim 1 wherein R is lower alkyl.

3. The compounds of claim 1 wherein X is oxygen.

4. p-Toluenesulfonamido diethyl phosphate.

5. Benzylsulfonamido diethyl phosphate.

6. p-Nitrobenzenesulfonamido diethyl phosphate.

7. n-Butanesulfonamido diethyl phosphate.

8. n-Butanesulfonamido diethyl thiophosphate.

9. A method for the preparation of a compound of the class $RSO_2NH.P(:X)(OR')_2$, which comprises reacting a compound of the class $RSO_2NHM$ with a compound of the class $X'P(:X)(OR')_2$ to form $RSO_2NH.P(:X)(OR')_2$ and $MX'$; R being a substituent selected from the group consisting of lower alkyl, lower alkylphenyl, phenyl lower alkyl, nitrophenyl, chlorophenyl and aminophenyl; M being an alkali metal; X' being halogen; X being selected from the group consisting of oxygen and sulfur and R' being an alkyl radical having from one to 8 carbon atoms.

10. A method according to claim 9 in which R is lower alkyl.

11. A method according to claim 9 in which M is sodium and in which X' is chlorine.

12. A method according to claim 9 in which X is oxygen.

13. A method according to claim 9 in which R is p-tolyl, in which M is sodium, in which X' is chlorine, in which X is oxygen and in which R' is ethyl.

14. A method according to claim 9 in which R is benzyl, in which M is sodium, in which X' is chlorine, in which X is oxygen and in which R' is ethyl.

15. A method according to claim 9 in which R is p-nitrophenyl, in which M is sodium, in which X' is chlorine, in which X is oxygen and in which R' is ethyl.

16. A method according to claim 9 in which R is n-butyl, in which M is sodium, in which X' is chlorine, in which X is oxygen and in which R' is ethyl.

17. A method according to claim 9 in which R is n-butyl, in which M is sodium, in which X' is chlorine, in which X is sulfur and in which R' is ethyl.

References Cited in the file of this patent

UNITED STATES PATENTS

| 1,955,207 | Stötter et al. | Apr. 17, 1934 |
| 2,490,573 | Atherton | Dec. 6, 1949 |

OTHER REFERENCES

Kosolapoff: "Organophosphorus Compounds," John Wiley & Sons, Inc., (1950), N.Y., pages 292-3.

Kirsanov et al.: "Z HUR. Obschei Khim.," vol. 24, pages 474-84, (1954) (Chem. Abst. (1955), vol. 49, column 6164).